Figure 3:
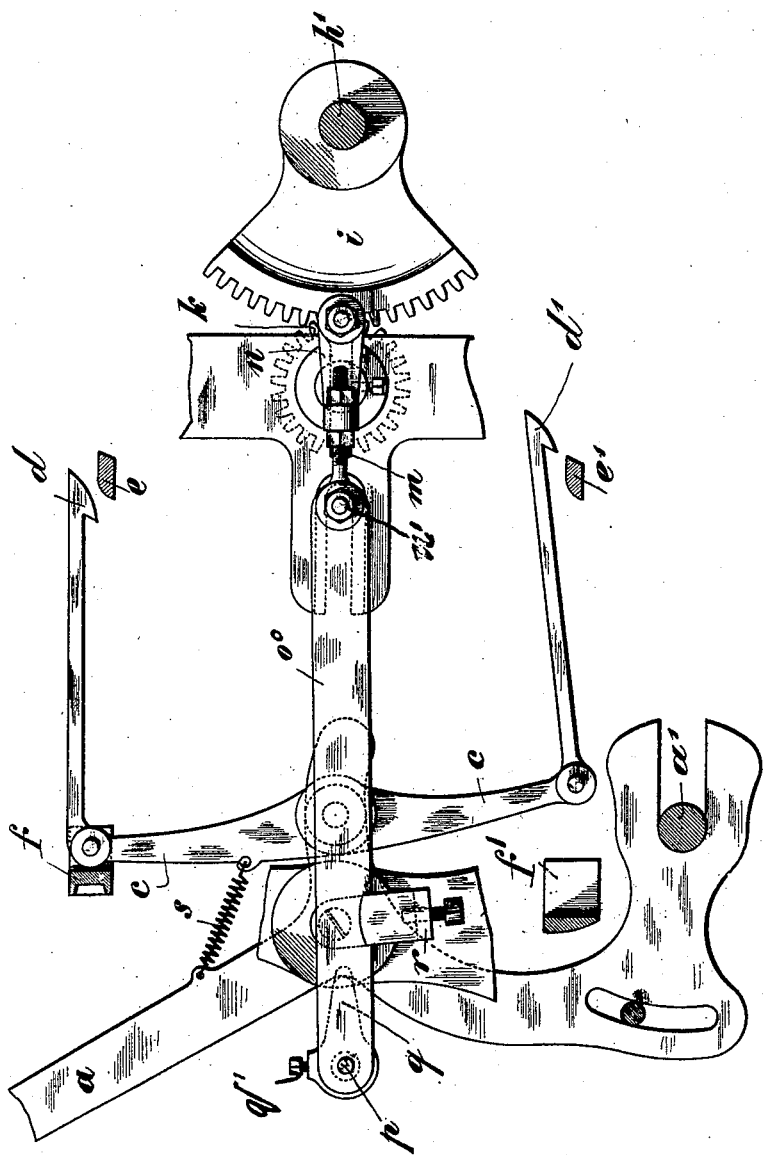
Figure 14:
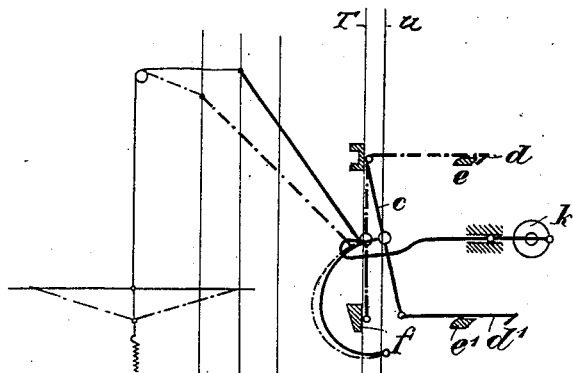

No. 680,181. Patented Aug. 6, 1901.
H. STÄUBLI.
SHEDDING MECHANISM FOR LOOMS.
(Application filed Sept. 12, 1896.)
(No Model.) 8 Sheets—Sheet 1.
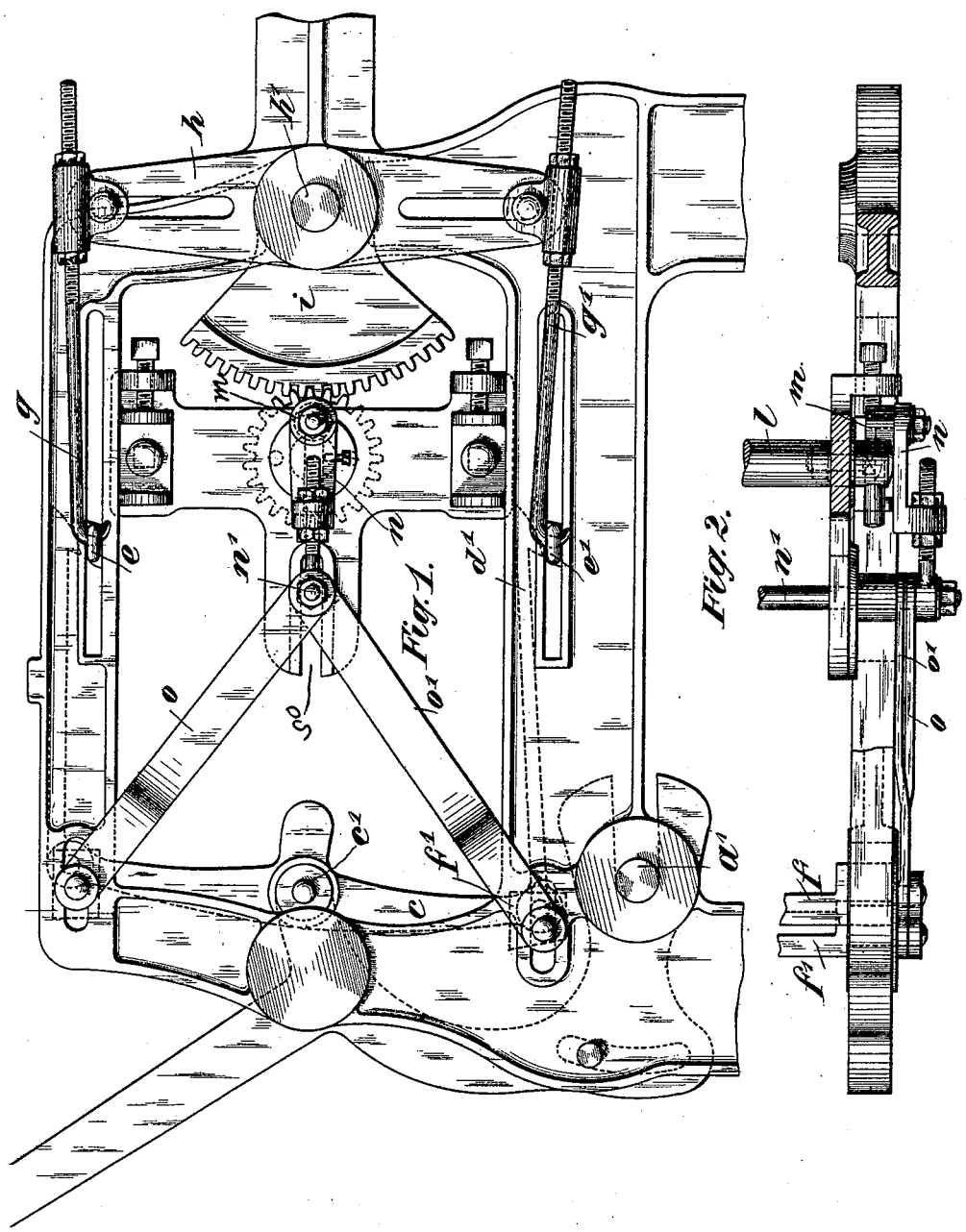
Witnesses:
H. van Oldenneel
E. A. Scott
Inventor:
Hermann Stäubli
by Richard N.
Attorney.

No. 680,181. Patented Aug. 6, 1901.
H. STÄUBLI.
SHEDDING MECHANISM FOR LOOMS.
(Application filed Sept. 12, 1896.)
(No Model.) 8 Sheets—Sheet 2.
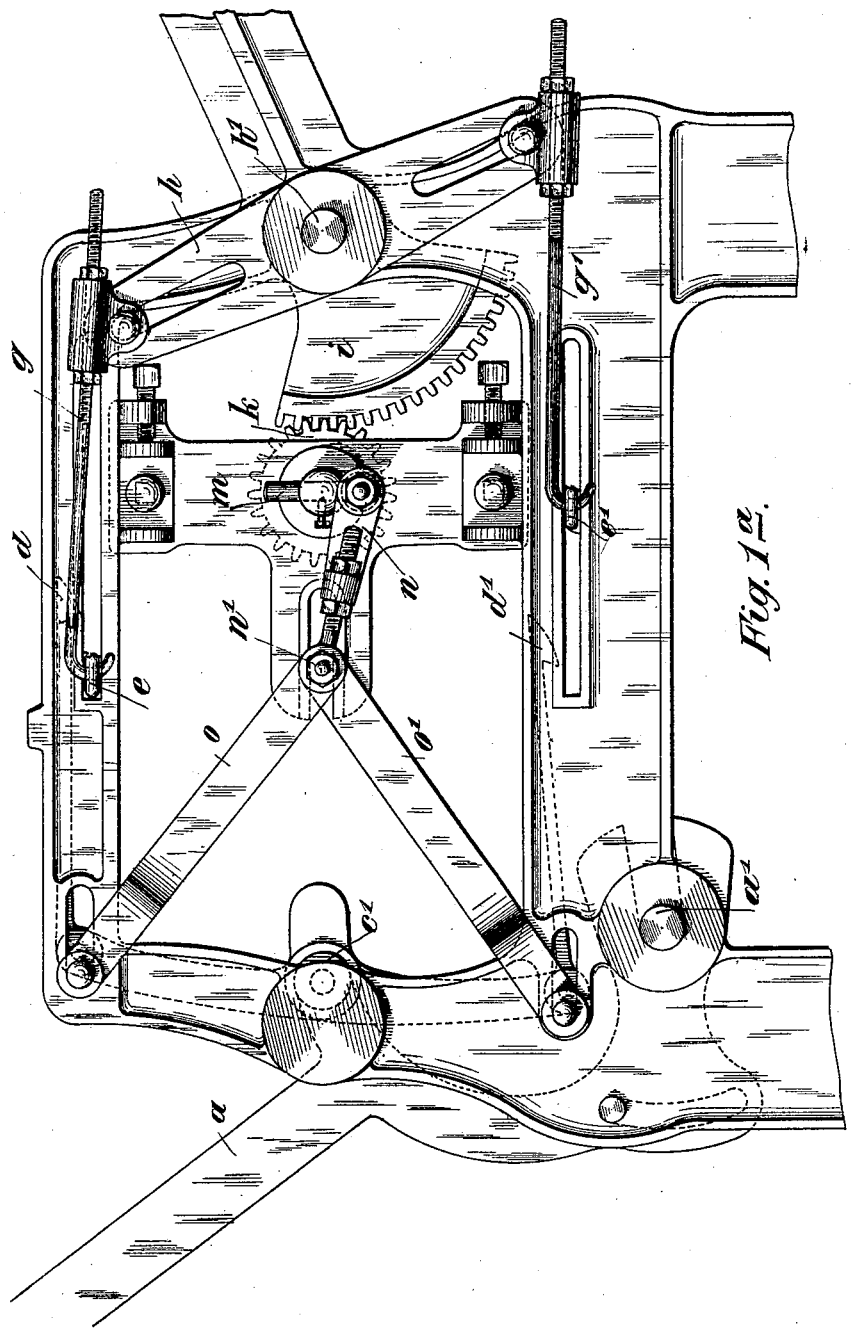
Fig. 1ª.
Witnesses:
H. van Oldenneel
E. A. Scott
Inventor:
Hermann Stäubli
by Richards
Attorneys

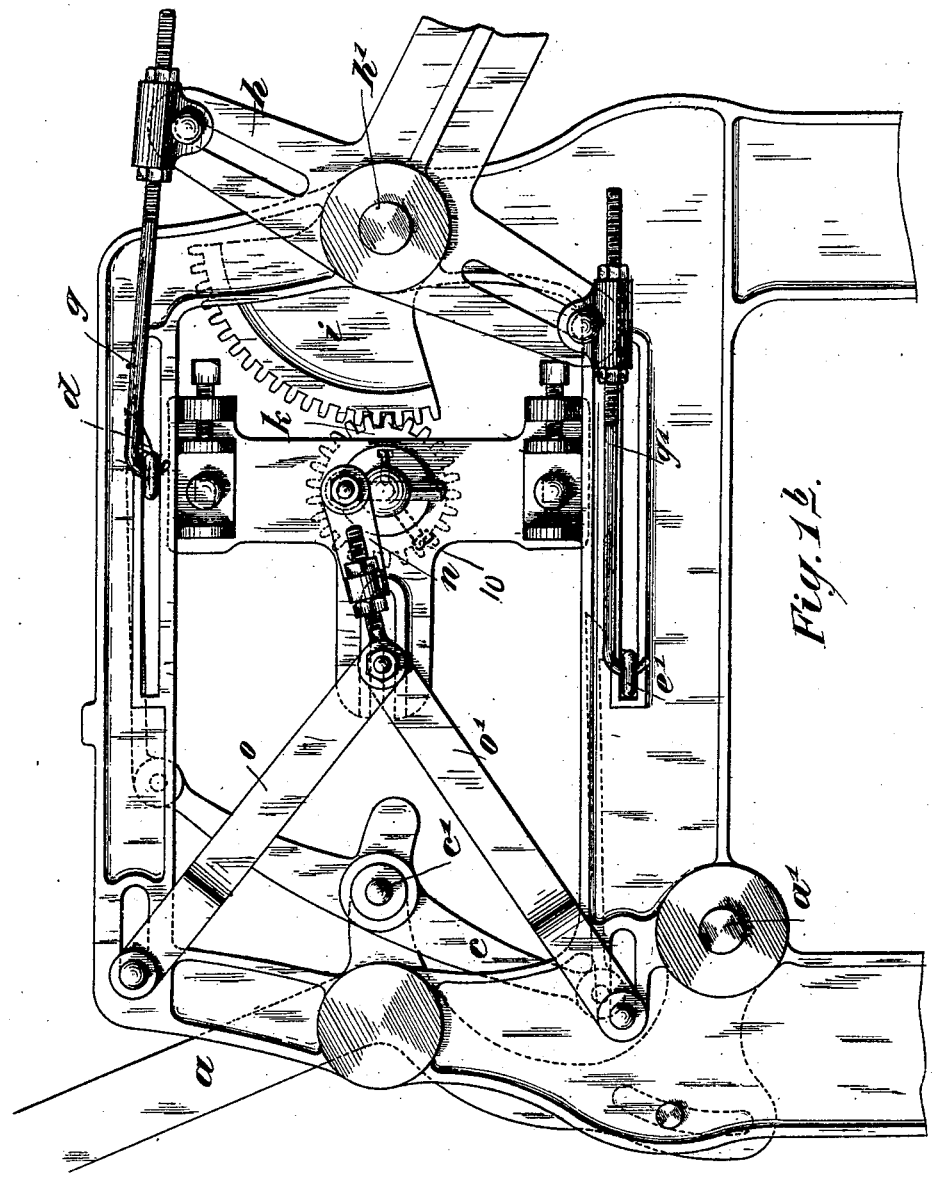

No. 680,181. Patented Aug. 6, 1901.
H. STÄUBLI.
SHEDDING MECHANISM FOR LOOMS.
(Application filed Sept. 12, 1896.)

(No Model.) 8 Sheets—Sheet 4.

Witnesses: Inventor:
Hermann Stäubli
by
Atty.

No. 680,181. Patented Aug. 6, 1901.
H. STÄUBLI.
SHEDDING MECHANISM FOR LOOMS.
(Application filed Sept. 12, 1896.)
(No Model.) 8 Sheets—Sheet 5.
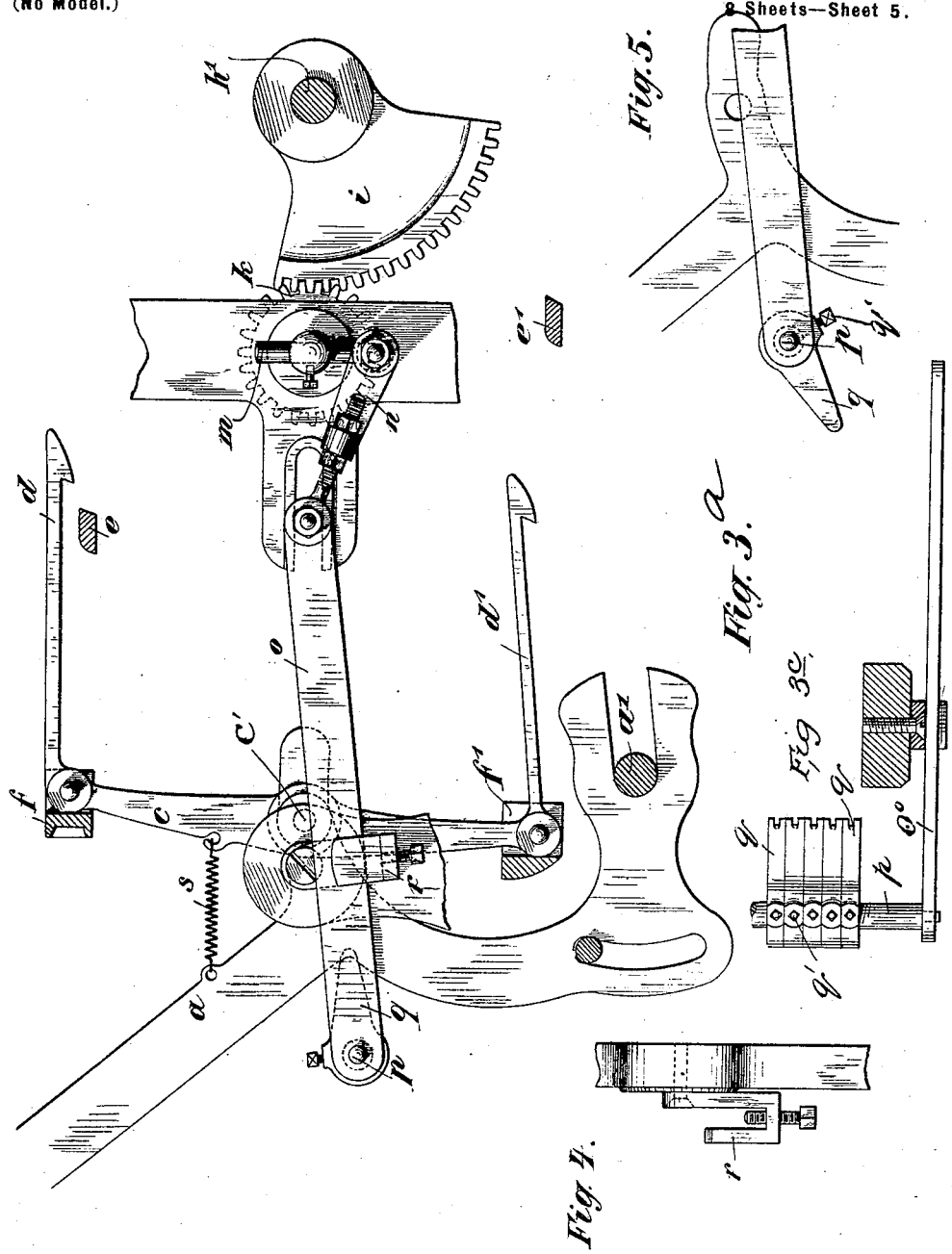
Witnesses:
H. van Oldennel
E. A. Scott
Inventor:
Hermann Stäubli
by Richards
Attorneys

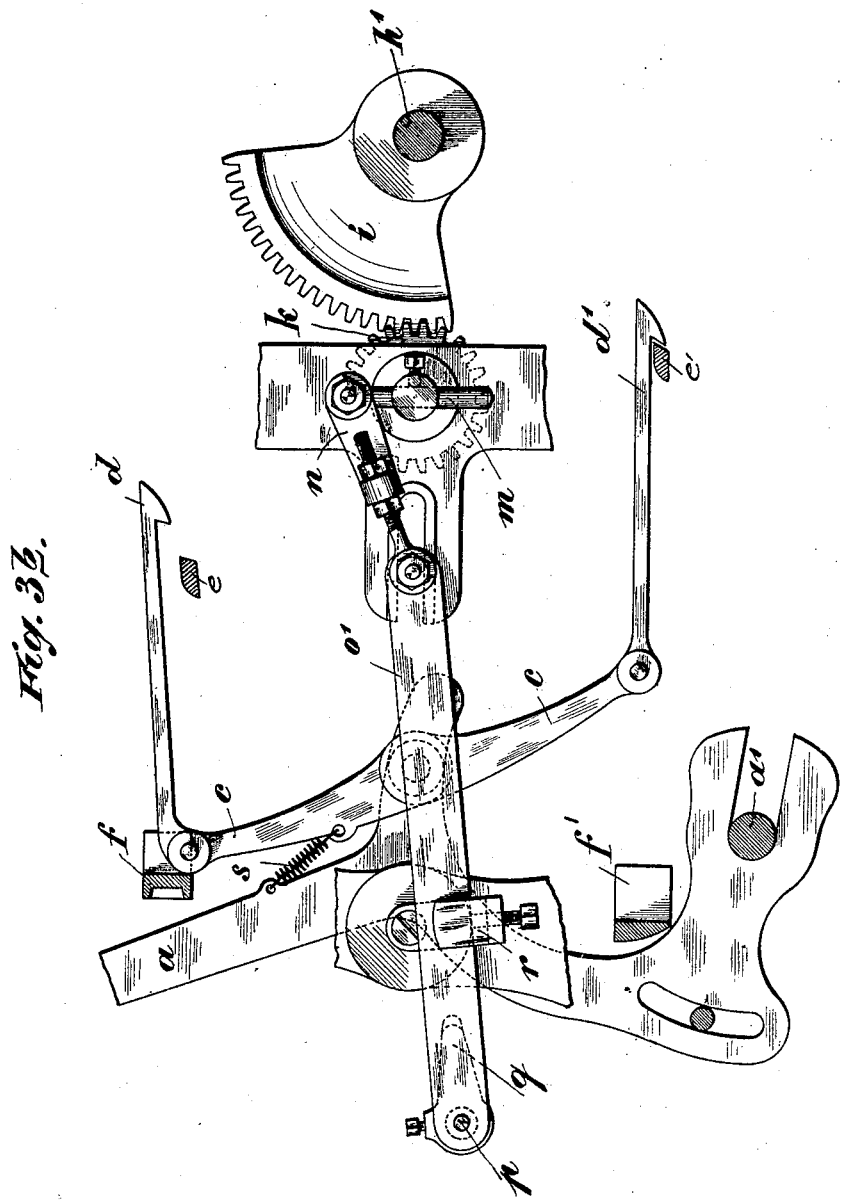

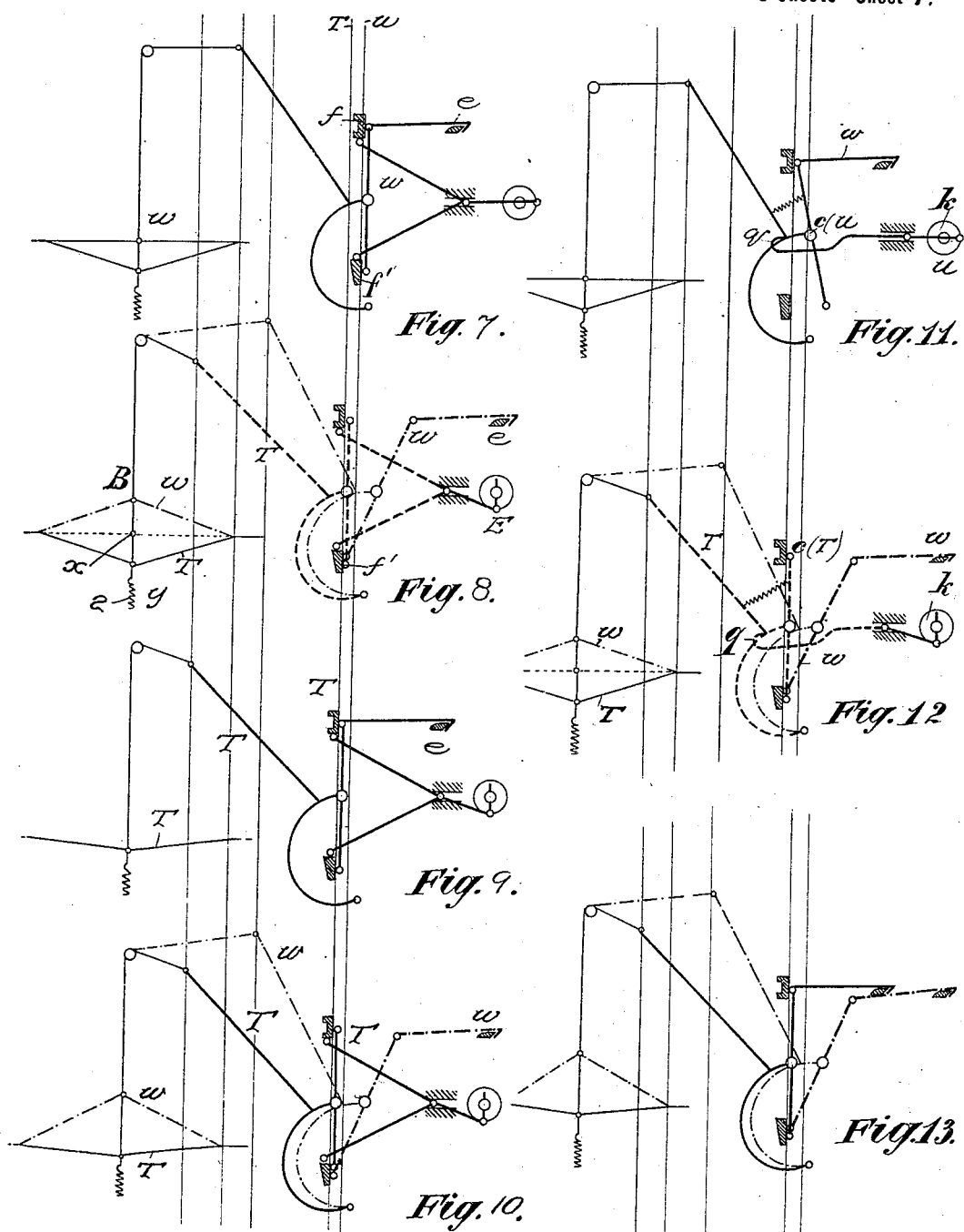

No. 680,181. Patented Aug. 6, 1901.
H. STÄUBLI.
SHEDDING MECHANISM FOR LOOMS.
(Application filed Sept. 12, 1896.)

(No Model.) 8 Sheets—Sheet 8.

Witnesses:

Inventor:
Hermann Stäubli
Attorneys

UNITED STATES PATENT OFFICE.

HERMANN STÄUBLI, OF HORGEN, SWITZERLAND.

SHEDDING MECHANISM FOR LOOMS.

SPECIFICATION forming part of Letters Patent No. 680,181, dated August 6, 1901.

Application filed September 12, 1896. Serial No. 605,672. (No model.)

*To all whom it may concern:*

Be it known that I, HERMANN STÄUBLI, a citizen of the Republic of Switzerland, and a resident of Horgen, in the Republic of Switzerland, have invented certain new and useful Improvements in Shedding Mechanism for Looms, (for which I have obtained patents in the following countries: Switzerland, No. 8,073, dated May 18, 1894; Germany, No. 80,548, dated June 1, 1894; France, No. 241,207, dated September 5, 1894; Austria, dated November 9, 1894, and Italy, R. G., No. 37,587, dated November 23, 1894,) of which the following is a specification.
The present invention relates to a shedding mechanism in a double-stroke machine, (similar to the Smith-Hattersley United States Patent No. 434,061;) and it is the object of the invention to provide means by which the machine can be transformed from a so-called "open-shed" machine into a closed-shed machine. This purpose is reached by introducing into the organs replacing the so-called "lifting-wire" supports an impulsion mechanism, which operates the said lifting-wire supports thus: that these supports may be used as closed-shed-lifting blades or knives where, as in the Smith-Hattersley machines, they are not movable and can only make open sheds.
With this invention it is, moreover, possible to let the shafts or harness-frames work partly with open and partly with closed shed. For this purpose an organ replacing the action of the movable lifting-wire supports and consisting of a closed-shed-lifting blade in separate parts is arranged separately for the purpose of operating each separate shaft or harness-frame, so that each shaft or harness-frame can be freed separately from this lifting-blade by removing the respective single parts, and thereby enabling it to work with open shed.

Figure 6:
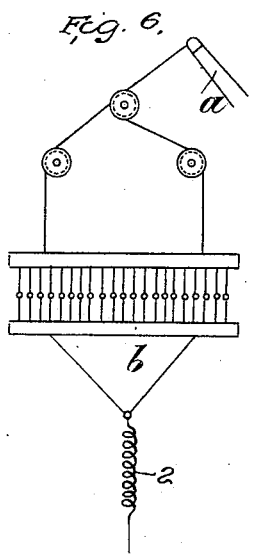
Figure 15:
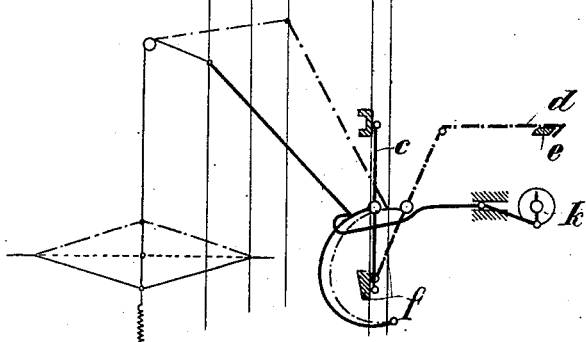

In the annexed drawings are shown two constructions of a machine according to the present invention.
Figure 1 is a side view of the invention. Figs. 1ᴬ and 1ᵇ show each a view similar to Fig. 1, but with the parts in a different position; Fig. 2, a horizontal section of a construction by which the machine can be transformed into a closed-shed or open-shed machine. Figs. 3, 3ª, and 3ᵇ show vertical sections in different positions of the essential organs with parts in side elevation. Fig. 3ᶜ is a plan view of certain needles and their shaft; and Figs. 4 and 5, separate parts of another construction by which the machine cannot only be transformed into an open-shed or closed-shed machine, but allows some shafts or harness-frames to make open sheds, as in the old system, while the rest of the shafts or harness-frames make closed sheds. Fig. 6 shows a diagrammatic view of the manner of suspending the shafts or harness-frames on the so-called "harness-levers." Figs. 7 to 15 show schematic working positions of the shed-forming organs in different ways of working the machine.

In this machine the harness-levers $a$ are arranged in the well-known manner, having on their lower end a fork comprising a spindle or axle $a'$, around which the levers are able to swing. On these harness-levers $a$ are suspended, as usually, the shafts or harness-frames $b$, as shown schematically in Fig. 6. The harness-levers have side arms, to which are hinged the jack-levers $c$ for the purpose of actuating the shafts in the known manner. To the levers $c$ are attached the hooks $d\ d'$ for lifting the shafts. The lifting-blades $e\ e'$ are in the reach of the said hooks for being taken along by the latter, which are moved with a reciprocal movement toward each other by the so-called "double-stroke" mechanism, which is to be described in the following: For the purpose of limiting this movement are arranged the two lifting-wire supports $f$ $f'$, against which the levers are propping. These levers have a center of motion around which they perform their oscillation. To the shed-lifting blades $e\ e'$ are hinged connecting-rods $g\ g'$, which are attached to a swinging lever $h$, which is mounted on the axle $h'$. To the lever $h$ is connected an arm, to the free end of which is connected the member of a moving mechanism, which mechanism swings the arm upwardly and downwardly, whereby the lever $h$ is turned around the axle $h'$. By this turning the shed-lifting blades $e\ e'$ are moved to and fro.

In the present invention on the axle $h'$ of the lever $h$, from which the reciprocal movement of the upper shed-lifting blades $e\ e'$ is derived by the intermediary of the connecting-rods $g\ g'$, is mounted a cogged wheel-sector $i$, which engages a spur-wheel $k$, the latter being on the shaft $l$. This spur-wheel $k$ is held adjustable in said shaft by a set-screw 10, Fig. 1$^b$. This spur-wheel is adapted to be shifted along the shaft $l$ to disengage from the sector $i$, so that the mechanism controlled by the spur-wheel may be thrown out of gear. This mechanism consists of connecting-rods $o\ o'$, which are pivoted to the lifting-wire supports $f\ f'$ and are geared together by the cranks $m$ on both ends of the shaft $l$, connected with the sliding rod or traverse $n'$, running in the frame-slit $S^0$, Fig. 1. The sliding rod is connected with the cranks by the links $n$. The proportion of their transmission between the sector $i$ and the spur-wheel $k'$ has been established, so that with normal amplitude of oscillation of the lever $h$ for the lifting-blades movement the shaft $l$ makes about half a revolution.

In the modification shown in Figs. 3 to 5 the guiding-rods attached to the connecting-clips $n$ are not connected with the devices or lifting-wire supports $f\ f'$, which are here rigid, but are connected (see $o^0$, Fig. 3) by a traverse or spindle $p$, lying across the harness-levers $a$ and carrying a number of cam-needles $q$, Fig. 3$^c$, corresponding to the number of harness levers or treadles, every one of which pushes against a knee of the harness-lever adapted opposite the pivot $c'$ of the lever. (Compare also Fig. 5, in which one of the needles $q$ is shown drawn back.) The spindle $p$ forms, therefore, with the needles $q$, a lower shed-lifting blade $e'$. The said guiding-rods $o^0$ are supported from below by the guides $r$, adapted to the sides of the frame, Figs. 3 and 4. The needles $q$ are secured to their spindles by set-screws $q^7$, so that by loosening these screws the needles may be directed forwardly or backwardly and then set in the desired position.

As well known, shedding mechanism for looms may be divided into two general classes—namely, those which are known as "closed shed" and those which are known as "open shed." In the class first mentioned each shed in the warp is formed by moving warp-threads out of the normal plane of the warp-threads in the loom, all of the threads thus moved out of the said plane being returned thereto after a pick of weft-thread has been introduced and prior to the formation of a new shed for the reception of the next weft-thread. In the other class if certain of the warp-threads are to appear on the same side of the weft-thread for two or more consecutive picks such warp-threads will be caused to remain in the position into which they were at first moved until after all of such picks have been introduced. It is found desirable to employ open-shed harness-operating mechanism in weaving certain materials and when it is desired to produce certain fabrics, while the use of closed-shed harness-operating mechanism is deemed best in the case of others. Now as a result of the mobility of the devices or lifting-wire supports $f$ and $f'$ in the construction Figs. 1 and 2 the whole machine may work also with open shed.

The working is shown in Figs. 7 and 8, where one of the shed-lifting blades $e$ passes from the position Fig. 7 into the position Fig. 8, the crank $m$, Figs. 1 and 2, descending at the same time from the horizontal position, Fig. 1, into one of the positions E. (See also Fig. 8.) The course of the chain $x$ B is therefore the result of the stroke of the lifting-blade $e$, whereas $x\ y$ is the result of the movement of the lifting-wire supports $f\ f'$. A spring 2, Fig. 6, under the shafts or harness-frames pulls the chain down into the position T.

The letters $w$, $u$, and T refer to the same movements of the parts throughout the several diagrams, $w$ always showing the highest, T the lowest, and $u$ the middle position of the parts.

If the motion mechanism of the lifting-wire supports $f\ f'$ is disconnected, which can be done by simply shifting the spur-wheel $k$ on its shaft $b$, the lifting-wire supports $f\ f'$ remain rigid, as in the Smith-Hattersley machines, and the machine works in the well-known manner as a closed-shed machine. This working is shown in Figs. 9 and 10. The shafts or harness-frames are supposed to be suspended so low that the drawn threads of the warp form (under the action of the above-mentioned weighting) from the beginning an obtuse angle—i. e., from a part of the intended shed-opening, Fig. 9. The upper shed-lifting blade $e$ then forms the shed shown in Fig. 10. The spur-wheel $k$ is held to its shaft by a set-screw 10, so that by loosening this screw the wheel may be shifted along its shaft to be out of mesh with the sector $i$.

By inserting the spur-wheel $k$ the traverse rod or spindle $p$, with the cams or needles, is put in motion and works then in the same way as the movable device $f$ in the construction shown in Figs. 1 and 2—i. e., as a movable lifting-wire support or as a lower shed-lifting blade $e'$, while the machine works as a closed-shed machine. Figs. 11 and 12 show the working in this case and correspond, therefore, to Figs. 7 and 8. While the different shafts or harness-frames, with their warp-threads corresponding to the loom-card, go up through the stroke of the upper shed-lifting blade, the needles $q$ let the remaining harness-levers and shafts or harness-frames, with their warp-threads, down. If the spur-wheel $k$ is disconnected, the traverse $p$, with the needles, is rigid, and the machine works in the old way as an open-shed machine. This working is shown in Fig. 13, in which the needles, as well as their impelling organs, are left out, because they are without effect. Fig. 13 concurs, therefore, with Fig. 10.

The construction shown in Figs. 3 to 5 presents a marked improvement compared to the construction in Figs. 1 and 2 by the fact that it allows some shafts or harness-frames to form open sheds according to the old way, while the remaining shafts or harness-frames make closed sheds. For this purpose the needles $q$ of those shafts or harness-frames which are to work in the old way with open shed are turned backward, as shown in Fig. 5, so that the harness-levers rest against the rigid devices $f$, obtaining thus rigid lifting-wire supports. The spur-wheel $k$ remains inserted, so that the remaining harness-levers are submitted to the action of the movable needles $q$ of the lower shed-lifting-blade—i. e., work as in an open-shed machine.

I claim—

1. In a double-lifting shedding-machine, having in combination with the shed-lifting blades $e\ e'$ a driving mechanism comprising a toothed wheel-sector $i$ mounted on the axle $h'$ of the double-armed rock-shaft $h$ actuating the said blades $e\ e'$ a spur-wheel $k$ engaging with the toothed wheel-sector $i$ and which can be thrown out of gear, cranks $m$ arranged on the shaft $l$ of the spur-wheel on both sides of the machine and having links $n$ a sliding traverse $n'$ connecting the links $n$, lifting-wire supports $f\ f'$ and connecting-rods $o$, $o'$, said parts being arranged in such a manner that reversing movements are imparted to the lifting-wire supports bringing the shed-lifting blades in the high and deep shed position.

2. In a double-lifting shedding-machine having in combination with the shed-lifting blades $e$, $e'$, a driving mechanism by means of which the said blades operate, and comprising the gearing $i$, $k$, $m$, $n$, with suitable connections, an arrangement comprising a traverse $p$ connected with the gearing $i$, $k$, $m$, $n$ and having cams or lifters $q$ which are movable for the purpose being thrown into and out of gear, and which when in operation support the shed-lifting blades so as to be actuated by the gearing mechanism and consequently operate as required for closed-shed weaving while the blade for which the lifters remain out of gear, is disconnected with the gearing and consequently operates on the open-shed principle.

3. In a double-lifting shedding-machine, having in combination with the shed-lifting blades $e\ e'$, a driving mechanism by which the said blades can be made to move either separately or jointly also for closed-shed weaving, the cranks of the gearing mechanism being adapted for displacing on the shaft $l$ in such a manner that their eccentricity can be altered according to requirements, and the links $n$ forming a part of the gearing, said links being adjustable as to length when it is necessary to alter the stroke of the gearing mechanism and therewith the deep-shed movement of the blades dependent on the same.

4. In a double-lifting shedding-machine, in combination with the harness-levers, with operating mechanism therefor, the devices acting on the harness-levers to control their movements, and controlling means for said devices comprising the pinion and segment, the crank $m$ in connection with the pinion to turn therewith the links $n$ connected with the crank and connections extending from the links $n$ to the devices to be moved, said parts being adjustable.

5. In a double-lifting shedding-machine in combination, the harness-levers, the mechanism for operating the same, the needles $q$ adapted to act on the levers to control the movements thereof, said needles being arranged to be thrown out of operation the carrier for said needles, and the driving mechanism for operating the carrier to change the position thereof relative to the levers, substantially as described.

In testimony whereof I hereunto sign my name, in the presence of two subscribing witnesses, this 19th day of August, 1896.

HERMANN STÄUBLI.

Witnesses:
H. RABBORT,
E. BLUM.